United States Patent
Shimizu

(10) Patent No.: US 10,986,204 B2
(45) Date of Patent: Apr. 20, 2021

(54) TERMINAL DEVICE, EDGE SERVER, DATA DELIVERY SYSTEM, AND DELIVERY CONTROL METHOD

(71) Applicant: PANASONIC CORPORATION, Osaka (JP)

(72) Inventor: Noriyuki Shimizu, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 199 days.

(21) Appl. No.: 16/103,148

(22) Filed: Aug. 14, 2018

(65) Prior Publication Data

US 2018/0359334 A1 Dec. 13, 2018

Related U.S. Application Data

(63) Continuation of application No. PCT/JP2016/001272, filed on Mar. 8, 2016.

(30) Foreign Application Priority Data

Feb. 16, 2016 (JP) .............................. JP2016-026973

(51) Int. Cl.
*H04L 29/08* (2006.01)
*H04L 29/06* (2006.01)
(Continued)

(52) U.S. Cl.
CPC ...... *H04L 67/2842* (2013.01); *H04L 65/1069* (2013.01); *H04L 65/4084* (2013.01);
(Continued)

(58) Field of Classification Search
CPC ............. H04L 65/1069; H04L 65/4084; H04L 65/605; H04L 65/80; H04L 67/2842; H04N 21/47217
See application file for complete search history.

(56) References Cited

U.S. PATENT DOCUMENTS

| 6,874,017 B1 * | 3/2005 | Inoue | H04L 12/189 709/217 |
| 2007/0167182 A1 * | 7/2007 | Tenhunen | H04M 15/55 455/512 |

(Continued)

FOREIGN PATENT DOCUMENTS

| JP | 2010-231798 | 10/2010 |
| JP | 2014-060678 | 4/2014 |

(Continued)

OTHER PUBLICATIONS

International Search Report (ISR) from International Searching Authority (Japan Patent Office) in International Pat. Appl. No. PCT/JP2016/001272, dated May 17, 2016.

*Primary Examiner* — Joe Chacko
(74) *Attorney, Agent, or Firm* — Greenblum & Bernstein, P.L.C.

(57) ABSTRACT

When playback of content has been requested, the terminal device according to the present invention determines whether or not an edge server has cache data for the content on the basis of information that is received from the edge server and that relates to the cache data retained by the edge server, and if it is determined that the edge server has cache data for the content, the terminal device determines whether or not the terminal device is communicating with the edge server via a base station capable of high-speed or high-capacity communication. If it is determined that the communicating base station is capable of high-speed or high-capacity communication, then the terminal device transmits, to the edge server, a request to change the delivery control method for the cache data for the content.

10 Claims, 11 Drawing Sheets

(51) Int. Cl.
　　　 *H04N 21/472* 　　　(2011.01)
　　　 *H04W 4/24* 　　　(2018.01)
(52) U.S. Cl.
　　　 CPC ............ *H04L 65/605* (2013.01); *H04L 65/80* (2013.01); *H04N 21/47217* (2013.01); *H04W 4/24* (2013.01)

(56) References Cited

U.S. PATENT DOCUMENTS

| | | | |
|---|---|---|---|
| 2008/0008130 A1* | 1/2008 | Haga | H04W 72/02 370/331 |
| 2013/0054729 A1* | 2/2013 | Jaiswal | H04W 4/029 709/213 |
| 2013/0130740 A1* | 5/2013 | Saito | H04W 88/06 455/552.1 |
| 2014/0082123 A1 | 3/2014 | Hasuo | |
| 2014/0115037 A1* | 4/2014 | Liu | H04L 67/2838 709/203 |
| 2014/0149603 A1* | 5/2014 | Park | H04L 67/02 709/238 |
| 2015/0181299 A1* | 6/2015 | Rauber | G06Q 30/0601 725/1 |

FOREIGN PATENT DOCUMENTS

| | | | | |
|---|---|---|---|---|
| JP | 2014-526167 | | 10/2014 | |
| WO | WO-2005036333 A2 * | | 4/2005 | ............ H04W 48/20 |

\* cited by examiner

US 10,986,204 B2

TERMINAL DEVICE, EDGE SERVER, DATA DELIVERY SYSTEM, AND DELIVERY CONTROL METHOD

CROSS-REFERENCE TO RELATED APPLICATIONS

This application is a Continuation of International Application No. PCT/JP2016/001272 filed Mar. 8, 2016, which claims priority of Japan Application No. JP 2016-026973 filed Feb. 16, 2016, the disclosures of which are expressly incorporated by reference herein in their entireties.

TECHNICAL FIELD

The present invention relates to a terminal device requesting delivery of content data, an edge server including the cache data of the content, a data delivery system in which the content data is delivered to the terminal device, and a delivery control method for the terminal device.

BACKGROUND ART

Recently, high-speed and high-capacity radio networks have spread, and, via such radio networks, streaming delivery of high-volume data such as video data or the like, for example, has been performed. Accordingly, the video data has occupied most of the traffic of radio networks recently, and the shortage of network bandwidth has been a problem.

For streaming utilizing the HTTP protocol, techniques in which a delivery server monitors the playback buffer size of a terminal and determines the transfer data amount depending on the playback buffer size, so as to prevent the shortage of network bandwidth have been under consideration.

Meanwhile, in order to distribute the network load or to shorten the delivery delay time, techniques in which content is delivered from a cache server nearest to an end user have been under consideration. As an example of such techniques, Patent Literature (hereinafter, referred to as "PTL") 1, for example, discloses a technique in which, after a content delivery server has delivered content to a terminal via a cache delivery server, the cache delivery server delivers the content cached by the cache delivery server when the terminal requests delivery of the same content for the second and succeeding times.

CITATION LIST

Patent Literature

PTL 1
Japanese Patent Application Laid-Open No. 2014-60678

SUMMARY OF INVENTION

Technical Problem

In the aforementioned conventional technique, radio communication environments currently available for terminals of users are not taken into account. For example, in the fifth generation telecommunications standard (5G), ultra-high-speed communication offering data rates as high as 10 Gbps is expected and, under such an environment, even high-volume video data can be transferred without any load being applied to a radio network. Meanwhile, when high-volume data transfer is begun under an environment in which the high-speed communication as mentioned above cannot be performed, a network load increases, which in turn may cause a problem such as an increase in download time, data loss due to congestion, and/or the like.

An object of the present invention is to provide a terminal device, an edge server, a data delivery system, and a delivery control method which make it possible to transfer data efficiently depending on a radio communication environment in which the user terminal of the user is placed.

Solution to Problem

A terminal device according to the present invention is a terminal device configured to receive cache data of content from an edge server via at least one base station, and includes: an edge determining processor configured to determine, when playback of content is requested, whether or not the edge server has the cache data of the content, based on information received from the edge server, the information being information on the cache data which the edge server has; a channel-capacity determining processor configured to determine whether or not the at least one base station is capable of high-speed or high-capacity communication, when the edge server has the cache data of the content; and a delivery-control-change requesting processor configured to transmit, to the edge server, a request to change a delivery control method for the cache data of the content, when the at least one base station is capable of the high-speed or high-capacity communication.

A terminal device according to the present invention is a terminal device configured to receive cache data of content from an edge server via at least one base station, and includes: an edge determining processor configured to determine, when playback of content is requested, whether or not the edge server has the cache data of the content, based on information received from the edge server, the information being information on the cache data which the edge server has; a communication-priority-level changing processor configured to raise, when the edge server has the cache data of the content, a priority level of radio communication with a first base station to a higher priority level than a priority level of radio communication with a second base station that is one of the at least one base station, the first base station being capable of higher-speed or higher-capacity communication than the second base station; and a delivery-control-change requesting processor configured to transmit, to the edge server, a request to change a delivery control method for the cache data of the content, when the communication with the first base station is established.

An edge server according to the present invention is an edge server configured to transmit cache data of content to a terminal device via at least one base station, and has: a cache-information generator configured to generate cache data of content delivered by another server, the cache-information generator being configured to transmit, to the terminal device, information on the cache data which the edge server has; and a delivery-control changing processor configured to change a delivery control method when the terminal device transmits a request to change the delivery control method for the cache data.

An edge server according to the present invention is an edge server configured to transmit cache data of content to a terminal device via at least one base station, and includes: a cache-information generator configured to generate cache data of content delivered by another server, the cache-information generator being configured to transmit, to the terminal device, information on the cache data which the edge server has; and a delivery-control changing processor configured to change a delivery control method when the terminal device transmits, after establishing radio communication with a first base station capable of higher-speed or higher-capacity communication than a second base station that is one of the at least one base station, a request to change the delivery control method for the cache data.

A data delivery system according to the present invention includes: an edge server, at least one base station, and a terminal device, the edge server being configured to generate and store cache data of content delivered by another server, the edge server being configured to transmit, to the terminal device, information on the cache data which the edge server has, the at least one base station being configured to relay communication between the terminal device and the edge server, the terminal device being configured to determine, then playback of content is requested, whether or not the edge server has the cache data of the content, based on the information received from the edge server, the information being information on the cache data which the edge server has, the terminal device being configured to determine, when it is determined that the edge server has the cache data of the content, whether or not the at least one base station is capable of high-speed or high-capacity communication, the terminal device being configured to transmit, to the edge server, a request to change a delivery control method for the cache data of the content, when it is determined that the at least one base station is capable of the high-speed or high-capacity communication.

A data delivery system according to the present invention includes: an edge server; at least two base stations; and a terminal device, the edge server being configured to generate and store cache data of content delivered by another server, the edge server being configured to transmit, to the terminal device, information on the cache data which the edge server has, the terminal device being configured to determine, when playback of content is requested, whether or not the edge server has the cache data of the content, based on the information received from the edge server, the information being information on the cache data which the edge server has, the terminal device being configured to raise, when it is determined that the edge server has the cache data of the content, a priority level of radio communication with a first base station to a higher priority level than a priority level of radio communication with a second base station that is one of the at least two base stations, the first base station being capable of higher--speed or higher-capacity communication than the second base station, the terminal device being configured to transmit, to the edge server, a request to change a delivery control method for the cache data of the content, when the communication with the first base station is established.

A delivery control method according to the present invention is a delivery control method for a terminal device configured to receive cache data of content from an edge server via at least one base station, and includes: determining, when playback of content is requested, whether or not the edge server has the cache data of the content, based on information received from the edge server, the information being information on the cache data which the edge server has; determining whether or not the at least one base station is capable of high-speed or high-capacity communication, when the edge server has the cache data of the content; and transmitting, to the edge server, a request to change a delivery control method for the cache data of the content, when the at least one base station is capable of the high-speed or high-capacity communication.

A delivery control method according to the present invention is a delivery control method for a terminal device configured to receive cache data of content from an edge server via at least one base station, and includes: determining, when playback of content is requested, whether or not the edge server has the cache data of the content, based on information received from the edge server, the information being information on the cache data which the edge server has; raising, when the edge server has the cache data of the content, a priority level of radio communication with a first base station to a higher priority level than a priority level of radio communication with a second base station that is one of the at least one base station, the first base station being capable of higher-speed or higher-capacity communication than the second base station; and transmitting, to the edge server, a request to change the delivery control method for the cache data of the content, when the communication with the first base station is established.

Advantageous Effects of Invention

According to the present invention, data can be transferred efficiently depending on a radio communication environment in which the user terminal is placed.

DESCRIPTION OF EMBODIMENTS

Figure 1:
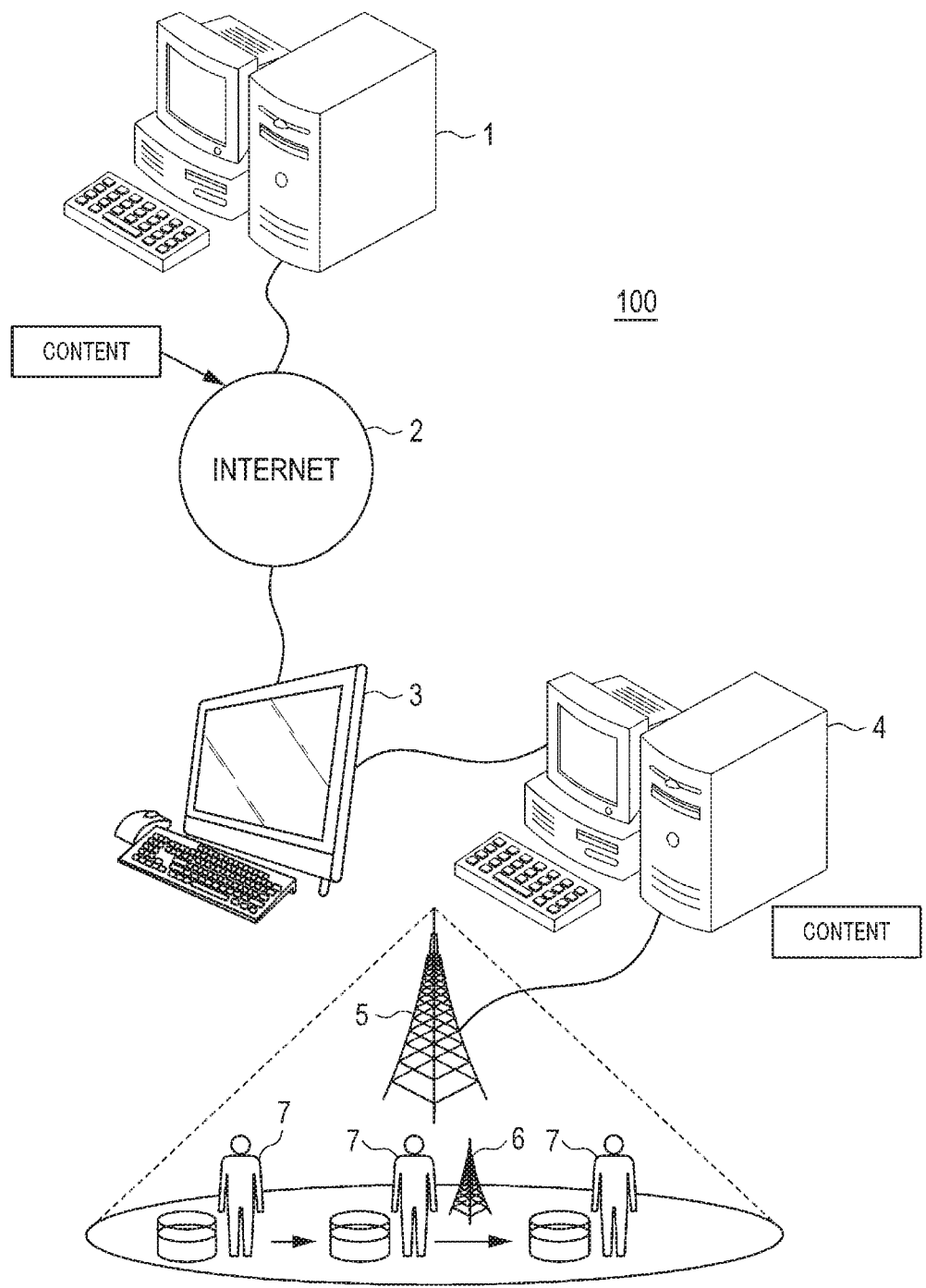
FIG. 1 illustrates an example of a configuration of a data delivery system according to embodiments of the present invention.

Hereinafter, embodiments of the present invention will be described in detail. FIG. 1 illustrates an example of a configuration of data delivery system 100 according to the embodiments of the present invention.

Original server 1 is a server device that delivers content data. Original server 1 is connected to edge server 4 via internet 2 and gateway 3. Edge server 4 stores therein the cache data of the content which has been once delivered from the original server to terminal device 7, and edge server 4 transfers the cache data of the content to terminal device 7 upon receipt of a delivery request for the content from terminal device 7. Edge server 4 and terminal device 7 are connected to each other via low-frequency-band base station 5 and/or high-frequency-band base station 6 in such a manner that edge server 4 and terminal device 7 can wirelessly communicate with each other. Low-frequency-band base station 5 corresponds to the second base station of the present invention, and high-frequency-hand base station 6 corresponds to the first base station of the present invention. Note that the number of base stations may also be one. Terminal device 7 is portable terminal equipment such as a smartphone, tablet, and/or the like by which content is downloaded from original server 1 or edge server 4 and played.

In the embodiments of the present invention, low-frequency-band base station 5 is a base station which performs radio communication using frequency bands called lower SHF hands ranging from about 3 GHz to 6 GHz, for example. High-frequency-band base station 6 is a base station which performs radio communication using frequency bands called higher SHF bands ranging from about 6 GHz to 30 GHz, for example. High-frequency-band base station 6 is capable of higher-speed communication with terminal device 7 than low-frequency-band base station 5. However, radio waves used for communication with high-frequency-band base station 6 is characterized by high straightness, small area where communication with base station 6 is possible (small cell), susceptibility to a blocking obstacle, and/or the like. For this reason, it is desirable that low-frequency-band base station 5 and high-frequency-band base station 6 be used properly depending on its use and/or depending on the purpose.

Figure 2:
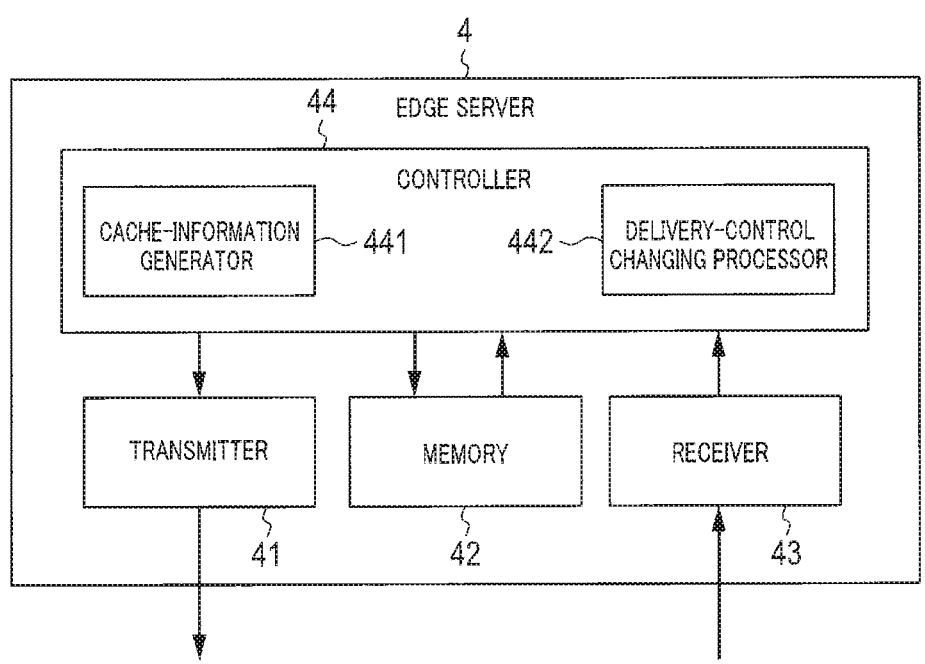
FIG. 2 is a block diagram illustrating an example of a configuration of an edge server.

Next, the configuration of edge server 4 will be described. FIG. 2 is a block diagram illustrating an example of the configuration of edge server 4. As illustrated in FIG. 2, edge server 4 includes transmitter 41, memory 42, receiver 43, and controller 44.

Transmitter 41 and receiver 43 transmit and receive data to and from original server 1 via Internet 2 and gateway 3. Transmitter 41 and receiver 43 also transmit and receive data to and from terminal device 7 in the radio communication via base station 5 or base station 6.

Memory 42 is a storage device that stores therein programs which are read out and run by controller 44, various data used for control by controller 44, cache data of content generated by cache-information generater 441, and/or the like.

Controller 44 controls the operation of edge server 4. Various modes of operation of edge server 4 are controlled by controller 44 through arithmetic processing performed by a CPU based on the various control programs and/or control maps stored in memory 42 and/or the like, for example. Controller 44 includes cache-information generator 441 and delivery-control changing processor 442 as operation blocks.

When content data according to a request is once delivered from original server 1 to terminal device 7 in response to the request from terminal device 7, cache-information generator 441 generates cache data of the delivered content and stores the cache data in memory 42. Note that, the cache data in the embodiments of the present invention means duplicate data of the data of some piece of content. Cache-information generator 441 also generates cache information indicating that edge server 4 has the cache data of some piece of content. This cache information, the details of which will be described below, is delivered to terminal device 7 and is used for determining whether or not edge server 4 has the cache data of the content.

Delivery-control changing processor 442 changes delivery-control parameters for terminal device 7 based on the information received via receiver 43 from terminal device 7.

The details of operation of cache-information generator 441 and delivery-control changing processor 442 which are operation blocks of controller 44 will be described below.

Figure 3:
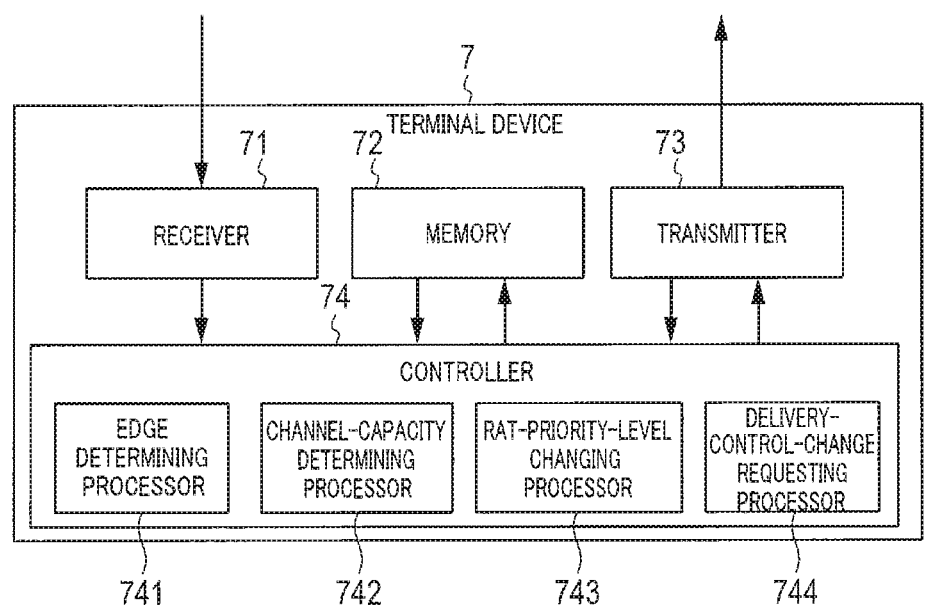
FIG. 3 is a block diagram illustrating an example of a configuration of a terminal device.

Next, a configuration of terminal device 7 will be described. FIG. 3 is a block diagram illustrating an example of the configuration of terminal device 7. As illustrated in FIG. 3, terminal device 7 includes receiver 71, memory 72, transmitter 73, and controller 74.

Receiver 71 and transmitter 73 transmit and receive data to and from edge server 4 or original server 1 in the radio communication via base station 5 or base station 6.

Memory 72 is a storage device that stores therein programs which are read out and run by controller 74, various data used for control by controller 74, cache information received from edge server 4, and/or the like.

Controller 74 controls the operation of terminal device 7 in accordance with user operation to an operation device (not illustrated), for example. Various modes of operation of terminal device 7 are controlled by controller 74 through arithmetic processing performed by a CPU based on the various control programs and/or control maps stored in memory 72 and/or the like, for example. Controller 74 includes edge determining processer 741, channel-capacity determining processer 742, RAT-priority-level changing processer 743, and delivery-control-change requesting processer 744 as operation blocks.

When edge determining processor 741 receives the delivery request for content data from the user, edge determining processor 741 determines whether or not edge server 4 has the cache data of the requested content. This determination is made based on the cache information received in advance from edge server 4 and stored in memory 72.

When it is determined, as a result of determination in edge determining processor 741, that edge server 4 has the cache data of the requested content, channel-capacity determining processor 742 determines based on a frequency band of a base station whether or not the currently-connected base station is capable of high-speed or high-capacity communication.

When it is determined, as a result of determination in channel-capacity determining processor 742, that the currently-connected base station is low-frequency-band base station 5 and is incapable of high-speed or high-capacity communication, for example, Radio-Access-Technology (RAT)-priority-level changing processor 743 raises the connection priority level of a high-capacity radio interface when the data delivery of the requested content is requested from edge server 4. Specifically, the priority level of communication via high-frequency-band base station 6 is raised to a higher priority level than the priority level of communication via currently-connected low-frequency-band base station 5 such that the communication with base station 6 is preferentially performed when high-frequency-band base station 6 exists within an area where terminal device 7 can communicate. Note that, RAT-priority-level changing processor 743 corresponds to the communication-priority-level changing processor of the present invention.

When the cache data of the requested content exists in edge server 4, and when the high-capacity radio interface can be used in the current radio-communication environment of terminal device 7, delivery-control-change requesting processor 744 maximize the playback buffer size for the content, in other words, transmits a request to change delivery control to edge server 4 so that the cache data is fully downloaded all at once (hereinafter, fully downloading all at once may simply be referred to as "full download").

Next, the exemplary operation of data delivery system 100 will be described.

<Exemplary Operation 1>

Figure 4:
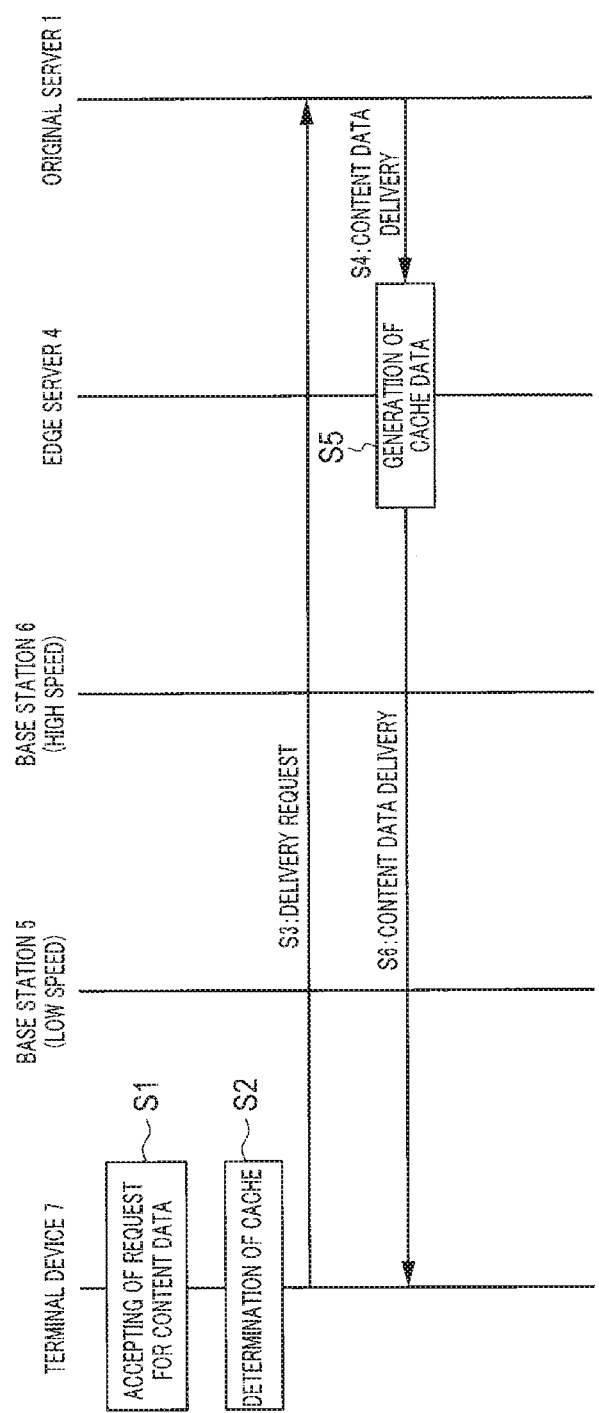
FIG. 4 is a sequence diagram for describing the exemplary operation of the data delivery system in a case where the terminal device requests delivery of content data not cached by the edge server.

FIG. 4 is a sequence diagram for describing the exemplary operation of data delivery system 100 in a case where terminal device 7 requests delivery of content data not cached by edge server 4.

At step S1 shown in FIG. 4, controller 74 of terminal device 7 accepts a request for content data from a user. Then, at step S2, edge determining processor 741 of terminal device 7 determines Whether or not edge server 4 has the cache data of the requested content. As an example of the method of determining whether or not edge server 4 has the cache data of the requested content, edge server 4 may deliver in advance, to terminal device 7, information (cache information) on the content which edge server 4 has its cache data, and edge determining processor 741 may determine whether or not edge server 4 has the cache data of the requested content, based on the cache information received from edge server 4. Since the exemplary operation illustrated in. FIG. 4 supposes a case where the content data not cached by edge server 4 is requested to be delivered, it is determined at step S2 of FIG. 4 that edge server 4 does not have the cache data of the requested content.

Next, at step S3, controller 74 transmits a delivery request for the content data to original server 1 via base station 5 or 6.

At step S4, original server 1 delivers the content data upon receipt of the delivery request for the content data from terminal device 7. In the delivery method, streaming delivery may be utilized, for example. Then, at step S5, cache-information generator 441 of edge server 4 obtains the content data delivered from original server 1, generates the cache data of the content data and stores the cache data in memory 42, and generates the cache information indicating that edge server 4 possesses the cache data of the content. Then, at step S6, the content data obtained from original server 1 is transmitted to terminal device 7. Note that, the cache information generated at step S5 is not shown in FIG. 4, but is transmitted to terminal device 7 and stored in memory 72 at any time even when the content corresponding to the cache information is not requested to be delivered. It is desirable that the cache information stored by terminal device 7 be updated, for example, at predetermined time intervals.

Terminal device 7 can receive the content data through the above-described operation.

Figure 5:
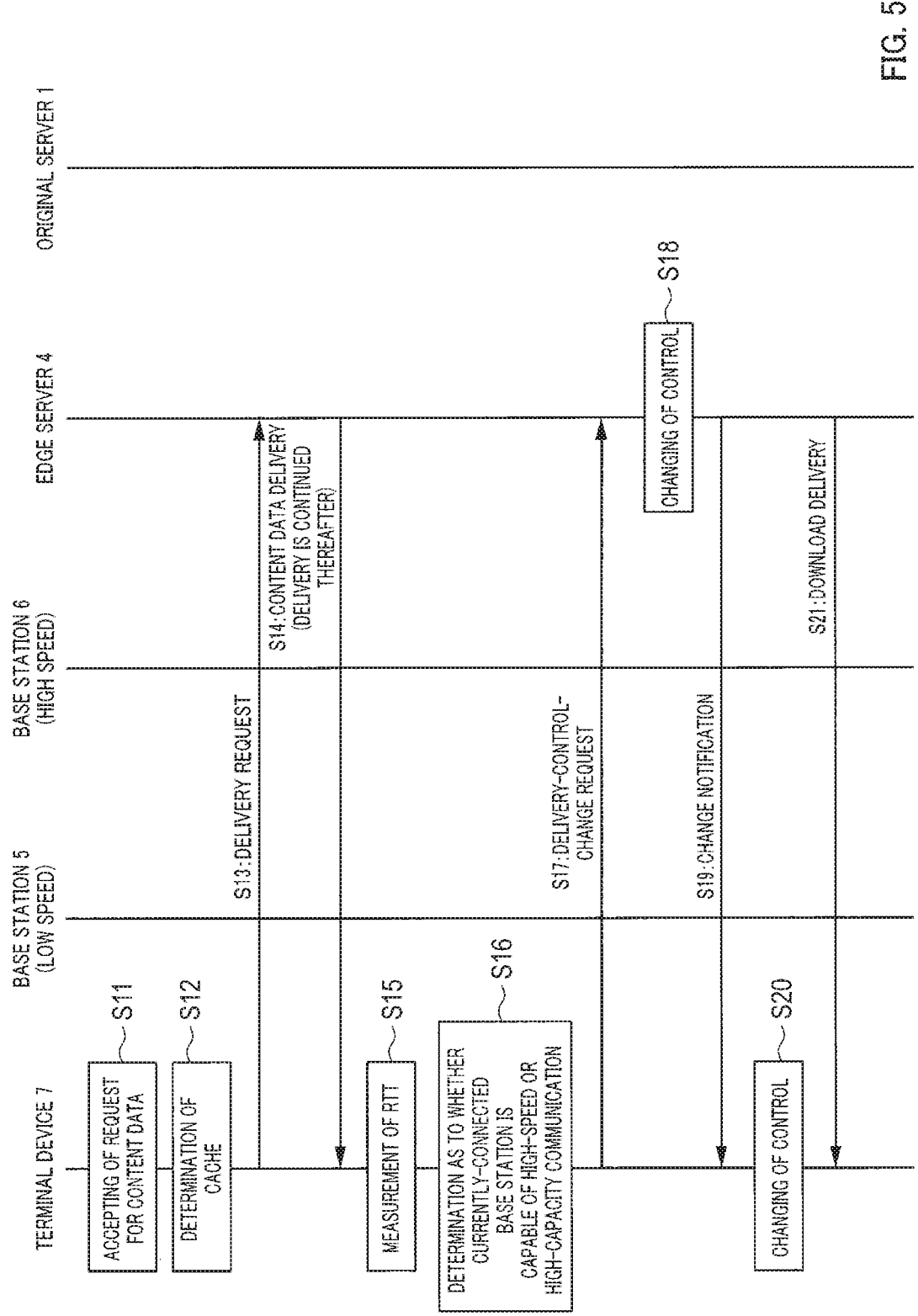
FIG. 5 is a sequence diagram for describing the exemplary operation of the data delivery system in a case where the terminal device requests delivery of content data cached by the edge server.
Figure 6:
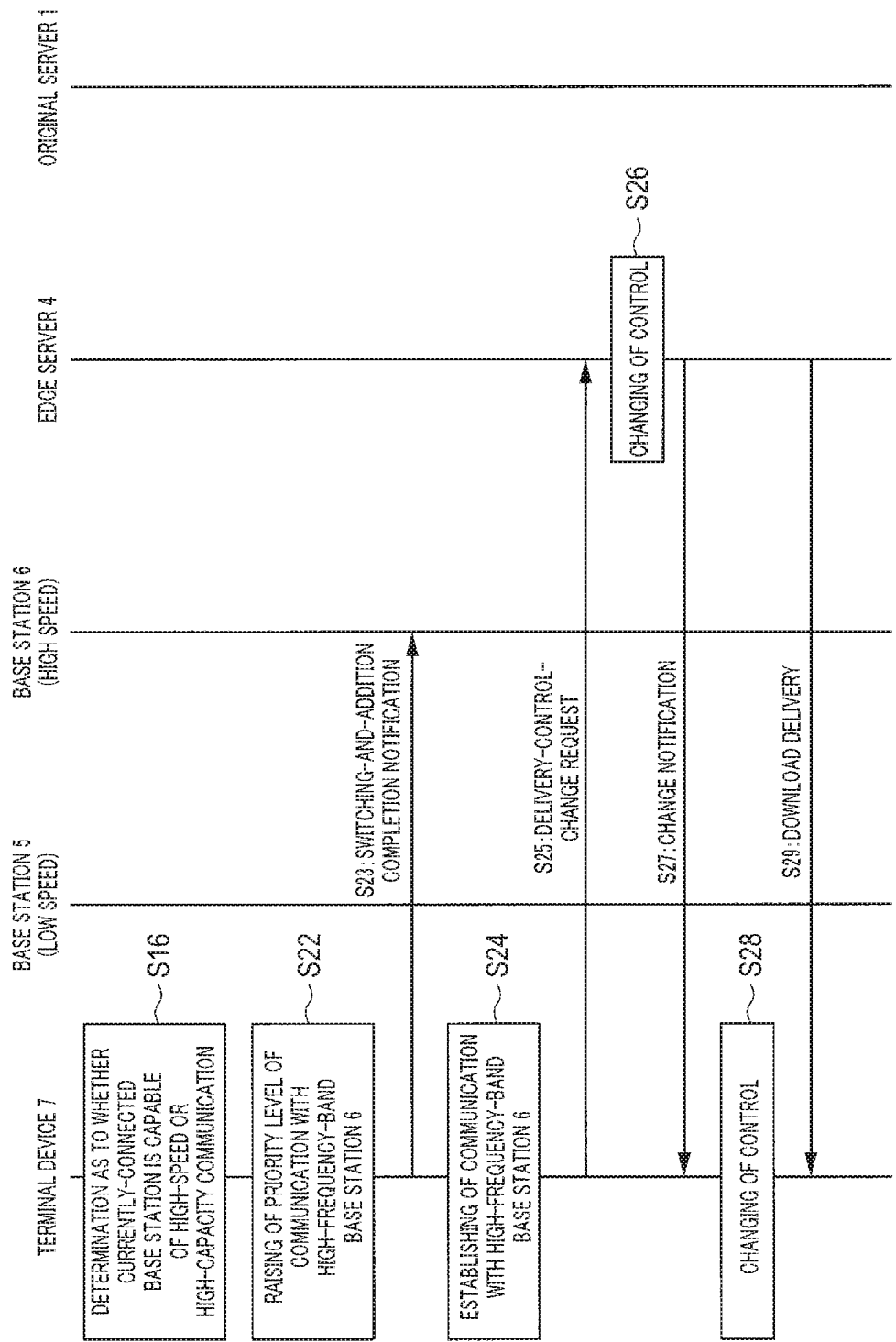
FIG. 6 is a sequence diagram of a case where a target base station for connection is switched from a currently-connected base station to another base station and a method for receiving content delivery is changed.

Next, FIGS. 5 and 6 are sequence diagrams for describing the exemplary operation of data delivery system 100 in cases where terminal device 7 requests delivery of content data cached by edge server 4. FIG. 5 is the sequence diagram in a case where a method for receiving content delivery via a currently-connected base station is changed, and FIG. 6 is the sequence diagram in a case where a target base station for connection is switched from the currently-connected base station to another base station and the method for receiving content delivery is changed.

At step S11 shown in FIG. 5, controller 74 of terminal device 7 accepts a request for content data from a user. Men, at step S12, edge determining processor 741 determines whether or not edge server 4 has the cache data of the requested content. This determination may he made by storing in memory 72 the cache information transmitted at any time from edge server 4 and reading the cache information out of memory 72 when needed, as described above. Note that, since the exemplary operation illustrated in FIG. 5 supposes a case where the content data cached by edge server 4 is requested to be delivered, it is determined at step S12 of FIG. 5 that edge server 4 has the cache data of the requested content. Note that, since the case where it is determined that edge server 4 does not have the cache data of the requested content has been described in association with FIG. 4, the description of such a case is omitted.

When it is determined that edge server 4 has the cache data of the requested content, controller 74 of terminal device 7 transmits a delivery request for the cache data to edge server 4 at step S13. At step S14, edge server 4 starts streaming delivery of the requested content to terminal device 7 based on the cache data. This streaming delivery continues thereafter as long as a stop request is not made by terminal device 7.

At step S15, edge determining processor 741 measures the Round Trip Time (RTT) which is round trip time for communication between terminal device 7 and edge server 4, and edge determining processor 741 confirms that the RTT is shorter than predetermined threshold Th. Even edge server 4 may be situated at a position distant from terminal device 7. Accordingly, it is confirmed at step S15 that the communication time between terminal device 7 and edge server 4 is shorter by a predetermined time than the communication time between terminal device 7 and original server 1 (it is confirmed that the terminal device is nearer to edge server 4 than to original server 1). Note that, when the measured RTT is equal to or greater than predetermined threshold Th, controller 74 does not perform the processes at and after step S16 and continues to receive the streaming delivery started at step S14. This is for performing the traditional control since, even when the content is cached by edge server 4, an effect on the network load is judged to be greater in the case where the communication time is greater than a predetermined value.

At step S16, channel-capacity determining processor 742 determines whether or not the currently-connected base station is capable of high-speed or high-capacity communication. This determination is made based on a frequency band used by the base station. For example, when the base station to which terminal device 7 is currently connected is base station 6 using a high-frequency band (higher SHF band) of 6 GHz or higher, it is determined that the base station is capable of the high-speed or high-capacity communication. In contrast, when the base station to which terminal device 7 is currently connected is base station 5 using a low-frequency band (lower SHF band) of less than 6 GHz, the process proceeds to the below-described processing at step S22 of FIG. 6.

When it is determined at step S16 that the currently-connected base station is capable of the high-speed or high-capacity communication, delivery-control-change requesting processor 744 of terminal device 7 transmits to edge server 4 a delivery-control-change request asking edge server 4 to fully deliver the cache data of the content all at once at step S17.

At step S18, edge server 4 makes a change in response to the delivery-control-change request such that full-download delivery of the cache data of the content is performed.

At step S19, edge server 4 notifies terminal device 7 that the delivery control has been changed. Controller 74 of terminal device 7 changes the method for receiving the delivery at step S20 accordingly. That is, to be more specific, controller 74 secures, using virtual memory and/or the like, a storage region allowing full-download data to be stored. Subsequently; at step S21, edge server 4 performs the full-download delivery of the rest of cache data of the content.

Meanwhile, when it is determined at aforementioned step S16 that the currently-connected base station is incapable of the high-speed or high-capacity communication (the currently-connected base station is a low-frequency-band base station), the process proceeds to step S22 of FIG. 6.

At step S22, RAT-priority-level changing processor 743 of terminal device 7 raises the priority level of the communication with high-frequency-band base station 6 to a higher priority level than the priority level of the communication with low-frequency-band base station 5 such that terminal device 7 is connected to high-frequency-band base station 6. Terminal device 7, after having raised the priority level of the communication with high-frequency-band base station 6, notifies a controlling base station (not illustrated) of a quality measurement report of high-frequency-band base station 6. The controlling base station determines, based on a value of the received quality measurement report, whether or not connection switching for changing the communication target of terminal device 7 from low-frequency-band base station 5 to high-frequency-band base station 6 is proper. The controlling base station, when determining that the switching is to be made, transmits a switching-and-addition instruction to terminal device 7. In response to this instruction, terminal device 7 notifies high-frequency-band base station 6 which is the communication target after the switching, of a switching-and-addition completion notification at step S23.

At step S24, controller 74 of terminal device 7 establishes the communication with high-frequency-band base station 6. This establishment of communication between terminal device 7 and high-frequency-band base station 6 means that the environment in which high-speed communication is possible is ready. In other words, the environment in which high-volume content data can be downloaded to terminal device 7 is ready. Note that, when for example the environment is not ready, the status quo is maintained, that is, terminal device 7 continues to receive streaming delivery via low-frequency-band base station 5.

At step S25, delivery-control-change requesting processor 744 of terminal device 7 transmits to edge server 4 a delivery-control-change request asking edge server 4 to fully deliver the cache data of the content all at once. At step S26, edge server 4 makes a change in response to the delivery-control-change request such that full-download delivery of the cache data of the content is performed. Note that, at step S25, terminal device 7 may transmit, together with the aforementioned delivery-control-change request, a line-information-change notification for notifying edge server 4 that terminal device 7 has established the communication with high-frequency-band base station 6, that is, for notifying that the high-speed and high-capacity line is usable.

At step S27, edge server 4 notifies terminal device 7 that the delivery control has been changed. Controller 74 of terminal device 7 changes the method for receiving the delivery at step S28 accordingly. That is, to be more specific, controller 74 secures, using virtual memory and/or the like, a storage region allowing full-download data to be stored. Subsequently; at step S29, edge server 4 performs the full-download delivery of the rest of cache data of the content. It is natural that, in this full delivery; edge server 4 delivers to terminal device 7 via high-frequency-band base station 6.

As described above, in the exemplary operation of data delivery system 100 as illustrated in FIGS. 4, 5, and 6, terminal device 7 requests edge server 4 to deliver when edge server 4 has the cache data of the content requested by the user who uses terminal device 7. Accordingly, edge server 4 instead of original server 1 delivers the content data to terminal device 7, so that the load on the wired network (internet 2) between edge server 4 and original server 1 does not increase and the traffic in the wired network can be collected to edge server 4, and it is also possible to preserve the quality of the content delivered to terminal device 7.

Additionally, in the case where terminal device 7 communicates with edge server 4 via low-frequency-band base station 5 during deliver of the cache data of the content, the cache data of the content is obtained using the streaming delivery which does not cause any load on the line. Meanwhile, in the case where terminal device 7 raises the priority level of the communication with high-frequency-band base station 6 and can establish the connection with high-frequency-band base station 6, terminal device 7 transmits to edge server 4 the delivery-control-change request to change the delivery method from the streaming delivery to the full-download delivery. Thus, it becomes possible to choose a suitable delivery method depending on the current radio-communication environment of terminal device 7. Additionally, only when communicating via high-frequency-band base station 6 (that is, only when the environment in which high-speed and high-capacity communication is performed is ready), terminal device 7 requests the full-download delivery which causes a load on the network. It is thus possible to collect, to a high-frequency band, the user traffic in the radio network composed of terminal device 7, low-frequency-band base station 5, and high-frequency-band base station 6. Thus, it becomes possible to improve the traffic acceptance ratio between low-frequency-band base station 5 and high-frequency-band base station 6.

<Exemplary Operation 2>

In Exemplary Operation 2 of data delivery system 100, terminal device 7 transmits, to edge server 4, line-charge information including information as to whether the line currently used by terminal device 7 is a free line or charged line, at step S17 shown in FIG. 5 or at step S25 shown in FIG. 6 of Exemplary Operation 1. Here, the delivery-control-change request transmitted at step S17 or step S25 in Exemplary Operation 1 may or may not be transmitted together with the line-charge information.

Determination as to whether the currently-used line is a free line or a charged line is made by determining the kind of the line currently used by terminal device 7, for example. For example, when terminal device 7 uses a public wireless LAN and/or the like, the currently-used line may be determined as the free line. Meanwhile, when terminal device 7 uses the line of a telecommunications carrier, the currently-used line may be determined as the charged line.

Then, at step S20, edge server 4 maintains or changes the delivery control of cache data in accordance with the line-charge information of step S19.

Figure 7:
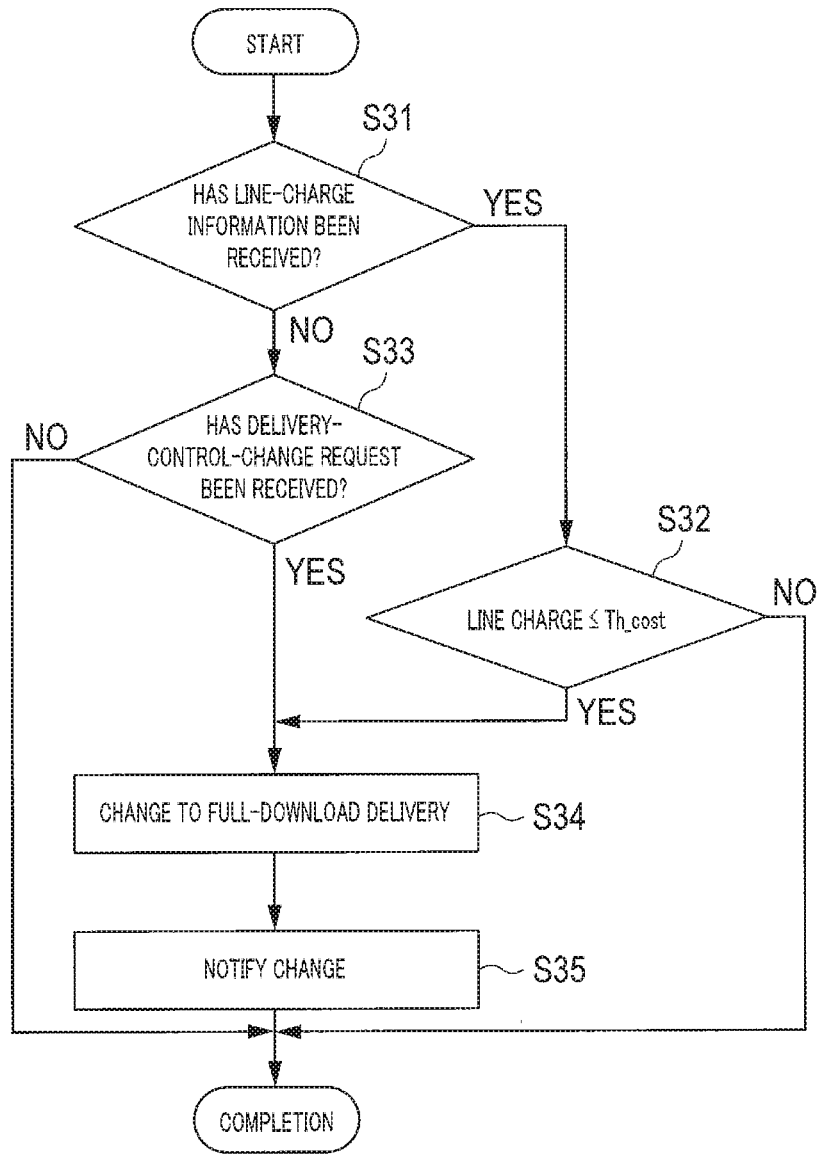
FIG. 7 is a flowchart for describing processing in a case where the edge server receives line-charge information in Exemplary Operation 2 of the data delivery system.

FIG. 7 is a flowchart for describing the processing related to the line-charge information performed by edge server 4 in Exemplary Operation 2. That is, FIG. 7 is for describing the details of processing at step S18 in FIG. 5 or at step S26 in FIG. 6 in Example 1.

At step S31, controller 44 of edge server 4 determines whether or not edge server 4 has received the line-charge information from terminal device 7. When edge server 4 has received the line-charge information, the processing proceeds to step S32, or, when edge server 4 has not received the line-charge information, the processing proceeds to step S33.

When edge server 4 has received the line-charge information, controller 44 of edge server 4 determines whether or not the line charge is equal to or less than predetermined charge Th_cost based on the line-charge information. When the line charge is equal to or less than predetermined charge Th_cost, the processing proceeds to step S34, or, when the line charge is greater than predetermined charge Th_cost, the processing is ended (i.e., edge server 4 continues streaming delivery without changing the delivery control).

When edge server 4 has not received the line-charge information, edge server 4 determines at step S33 whether or not edge server 4 has received the delivery-control-change request. When edge server 4 has received the delivery-control-change request or when edge server has received the line-charge information and the line charge is equal to or less than predetermined charge Th_cost, controller 44 changes at step S34 the method of delivering the cache data from the streaming delivery to the full-download delivery. Then, at step S35, edge server 4 notifies terminal device 7 of the change in control. Meanwhile, when edge server 4 has not received the delivery-control-change request at step S33, controller 44 ends the processing.

As mentioned above, in Exemplary Operation 2, the line-charge information including information as to whether the line currently used by terminal device 7 is a free line or charged line is transmitted to edge server 4. Then, when no delivery-control-change request has been transmitted to edge server 4 from terminal device 7 and when the line charge is greater than predetermined charge Th_cost, it is considered that terminal device 7 is not situated in a radio-communication environment suitable for fully delivering high-volume data all at once and, accordingly, edge server 4 does not change the delivery method and continues the streaming delivery.

In this case, predetermined charge Th_cost may be zero yen, for example, or may also be any amount of money. When predetermined charge Th_cost is set to zero yen, edge server 4 does not change the delivery method when even only a small amount of telecommunications charge arises. When predetermined charge Th_cost is set to any amount of money, edge server 4 changes the delivery control when the telecommunications charge is equal to or less than the amount of money. Thus, it becomes possible to prevent a change in delivery control which is not preferable for the user of terminal device 7.

<Exemplary Operation 3>

Figure 8:
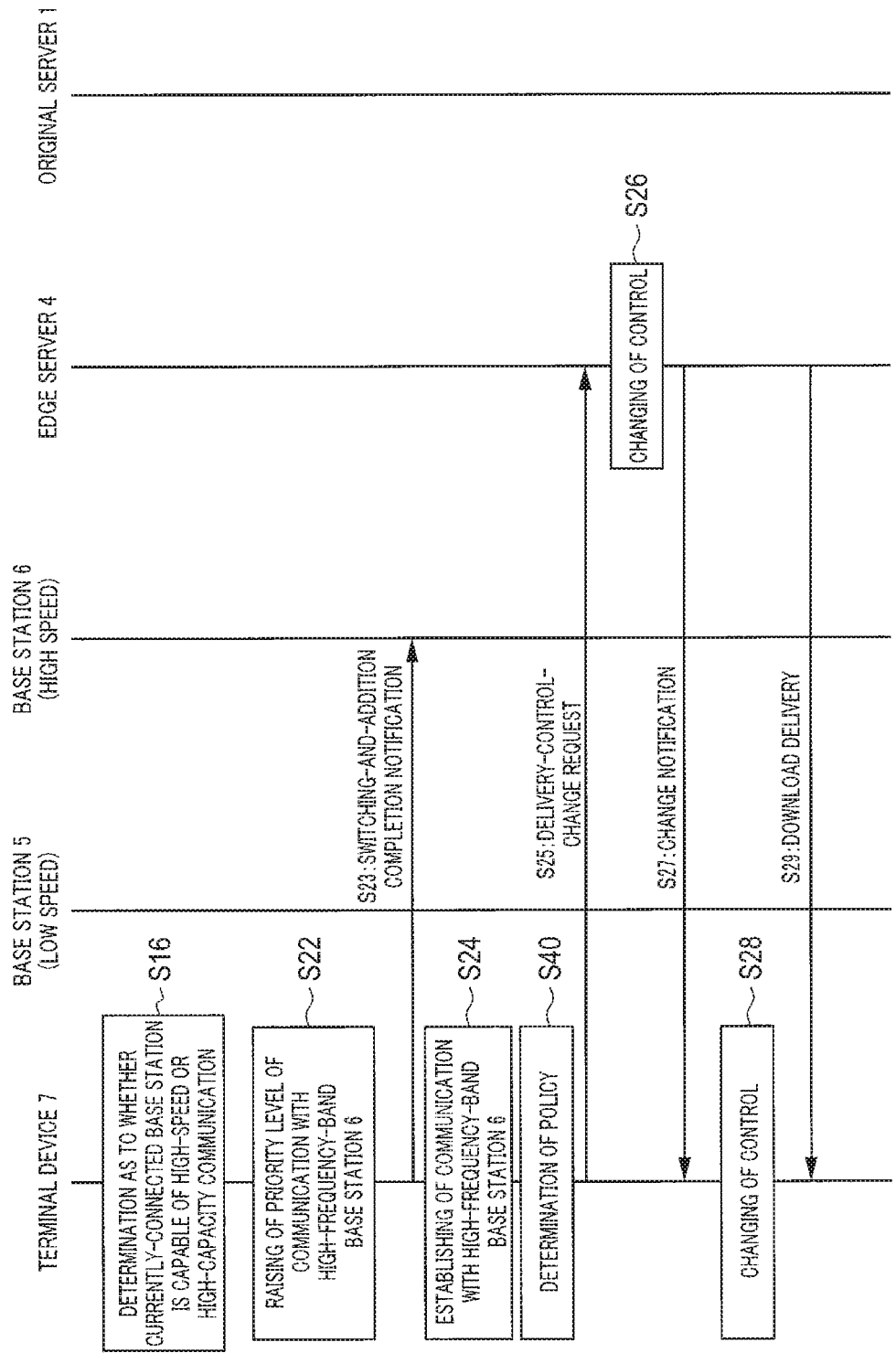
FIG. 8 is a sequence diagram for describing Exemplary Operation 3 of the data delivery system.

In Exemplary Operation 3 of data delivery system 100, the delivery control is determined in accordance with a policy decided in advance by the user of terminal device 7. FIG. 8 is a sequence diagram for describing Exemplary Operation 3. As illustrated in FIG. 8, Exemplary Operation 3 is the same as Exemplary Operation 1 except for the processing of policy determination indicated at step S40 added as processing to be performed by terminal device 7. Accordingly, the policy determination indicated at step S40 will be described in detail hereinbelow, and the descriptions of processing at the other steps will be omitted.

Figure 9:
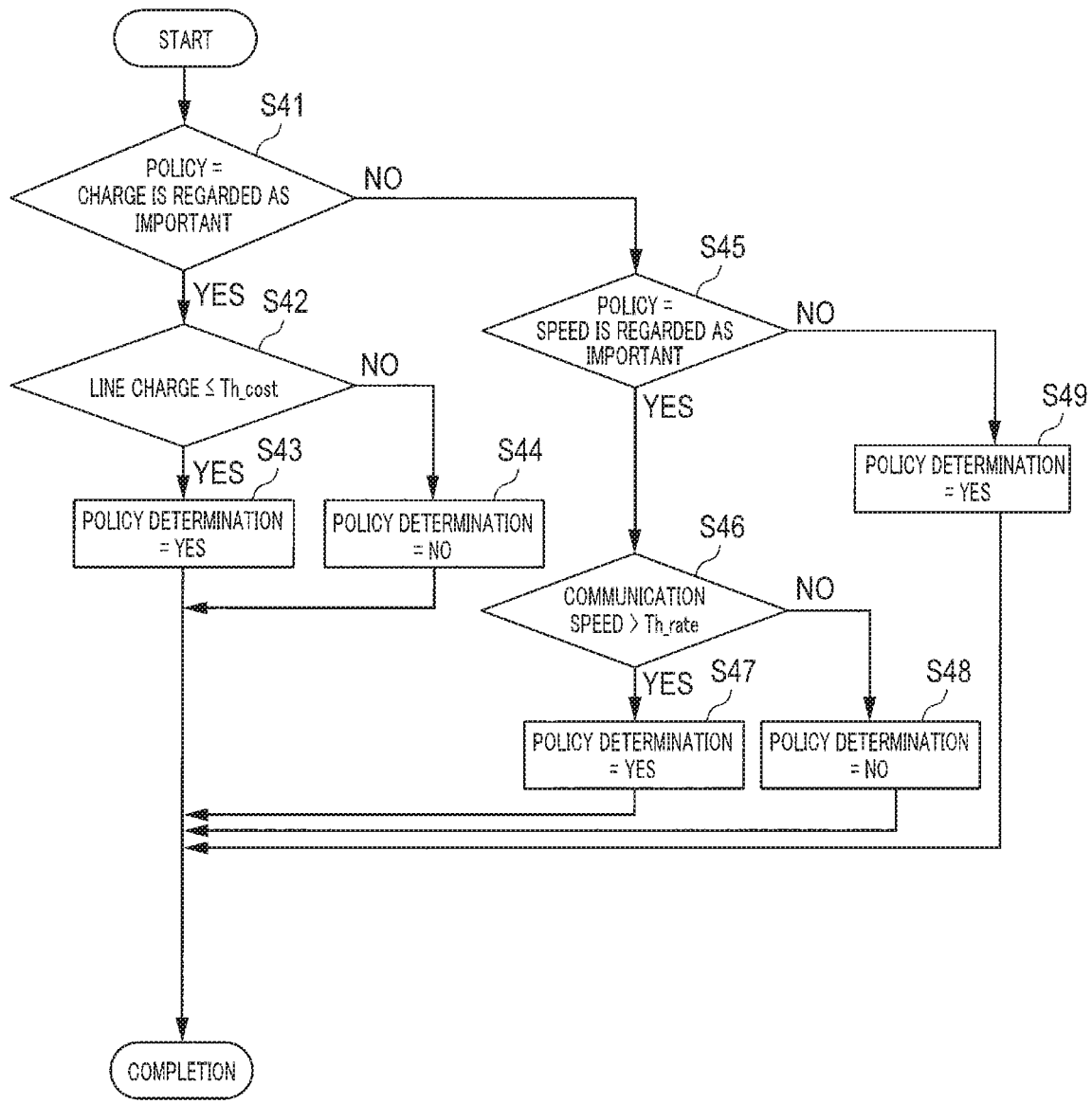
FIG. 9 is a flowchart for describing the details of policy determination indicated at step S40 of FIG. 8.

FIG. 9 is a flowchart for describing the details of policy determination indicated at step S40 in FIG. 8. Note that, as premises, a policy is set by the user of terminal device 7 and the policy is stored in memory 72 in advance as policy information in Exemplary Operation 3. Note also that, it is supposed that the streaming delivery which is controlled while a playback buffer is monitored is currently performed.

At step S41, controller 74 of terminal device 7 determines, with reference to the policy information, whether or not a setting that the charge is regarded as important has been made. When the setting that the charge is regarded as important has been made, the processing proceeds to step S42, or, when such a setting has not been made, the processing proceeds to step S45.

When the setting that the charge is regarded as important has been made, controller 74 determines at step S42 whether or not the present line charge is equal to or less than predetermined charge Th_cost. When the present line charge is equal to or less than predetermined charge Th_cost, the processing proceeds to step S43, or, when the present line charge is greater than predetermined charge Th_cost, the processing proceeds to step S44.

When the present line charge is equal to or less than predetermined charge Th_cost, controller 74 sets the policy determination result to YES (changes to full download) at step S43, and completes the processing. Meanwhile, when the present line charge is greater than predetermined charge Th_cost, controller 74 sets the policy deter dilation result to NO (continues streaming delivery) at step S44, and completes the processing.

In addition, when the policy setting that the charge is regarded as important has not been made, controller 74 determines at step S45, with reference to the policy information, whether or not a setting that the communication speed is regarded as important has been made. When the setting that the communication speed is regarded as important has been made, the processing proceeds to step S46, or, when such a setting has not been made, the processing proceeds to step S49.

When the setting that the communication speed is regarded as important has been made, controller 74 determines whether or not the present communication speed is greater than predetermined speed Th_rate at step S46. When the present line speed is greater than predetermined speed Th_rate, the processing proceeds to step S47, or, when the present line speed is equal to or less than predetermined speed Th_rate, the processing proceeds to step S48.

When the present communication speed is greater than predetermined speed Th_rate, controller 74 sets the policy determination result to YES (changes to full download) at step S47, and completes the processing. Meanwhile, when the present communication speed is equal to or less than predetermined speed Th_rate, controller 74 sets the policy determination result to NO (continues streaming delivery) at step S48, and completes the processing.

When neither the setting that the charge is regarded as important nor the setting that the communication speed is regarded as important has been made (that is, when the policy setting itself has not been made), controller 74 sets the policy determination result to YES (changes to full download) at step S49, and completes the processing. Note that, even when neither the setting that the charge is regarded as important nor the setting that the communication speed is regarded as important has been made, in a case where another setting that an item other than the charge and communication speed is regarded as important has been made, further determination may be made as to whether such an item satisfies a predetermined condition.

When such a policy determination result indicates YES, the processing proceeds to step S25 in FIG. 8, where the delivery-control-change request is made in order to make a change to full download. Meanwhile, when the policy determination result indicates NO, the status-quo is maintained after step S40 in FIG. 8 (i.e., terminal device 7 continues to receive the streaming delivery from edge server 4 via low-frequency-hand base station 5).

As mentioned above, in Exemplary Operation 3, the policy determination is made based on the policy information set in advance by the user and, only when the policy determination result is YES, the subsequent processing is performed (i.e., the delivery-control-change request asking for a change to full download is transmitted). When the policy is set such the charge is regarded as important, the policy determination result indicates YES only when the line charge is equal to or less than predetermined charge Th_cost. Accordingly, it becomes possible to prevent a change in delivery control which is not preferable for the user of terminal device 7.

In addition, when the policy is set such that the communication speed is regarded as important, the policy determination result indicates YES only when the line speed is greater than predetermined speed Th_rate. Accordingly, it is possible to avoid a situation where an excessive load is applied to the radio network because terminal device 7 transmits the delivery-control-change request in a case where a sufficient communication speed cannot be secured.

Note that, the above descriptions have been given in relation to the case where the delivery control is changed to full download during the operation of streaming delivery when the line charge is equal to or less than a predetermined charge or the communication speed is greater than a predetermined speed. Note that, in a case where the delivery control is already the full download, the full download is continued when the line charge is equal to or less than a predetermined charge or the communication speed is greater than a predetermined speed and when the policy determination result indicates YES accordingly; or otherwise, the delivery control is changed to the streaming delivery when the policy determination result indicates NO.

<Exemplary Operation 4>

Figure 10:
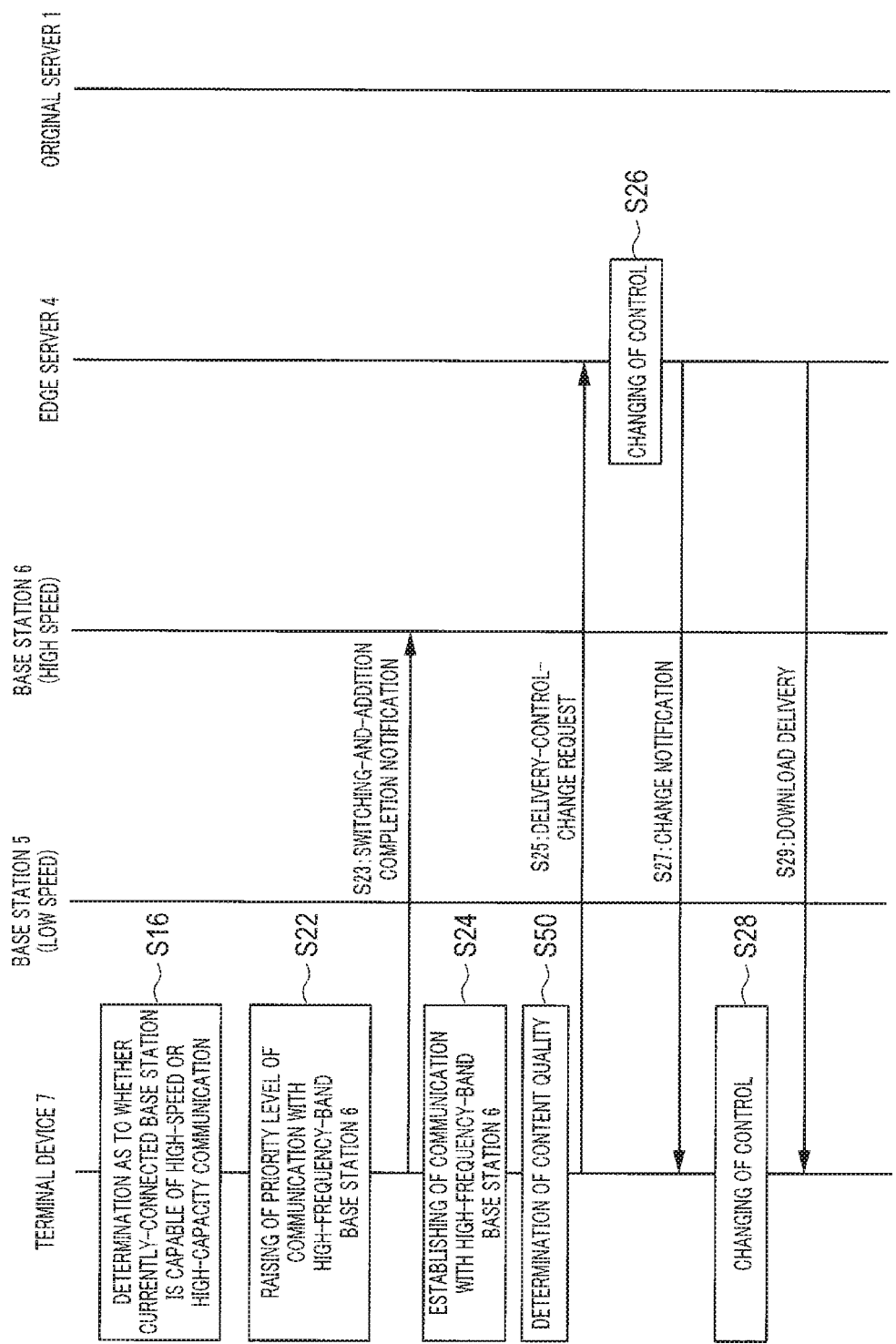
FIG. 10 is a sequence diagram for describing Exemplary Operation 4 of the data delivery system.

In Exemplary Operation 4 of data delivery system 100, the quality of requested content is determined by the user of terminal device 7, and the delivery control is decided according to the determination result. FIG. 10 is a sequence diagram for describing Exemplary Operation 4. As illustrated in FIG. 10, Exemplary Operation 4 is the same as Exemplary Operation 1 except for the processing of content quality determination indicated at step S50 added as processing to be performed by terminal device 7. Accordingly, the content quality determination indicated at step S50 will be described in detail hereinbelow, and the descriptions of processing at the other steps will be omitted.

Figure 11:
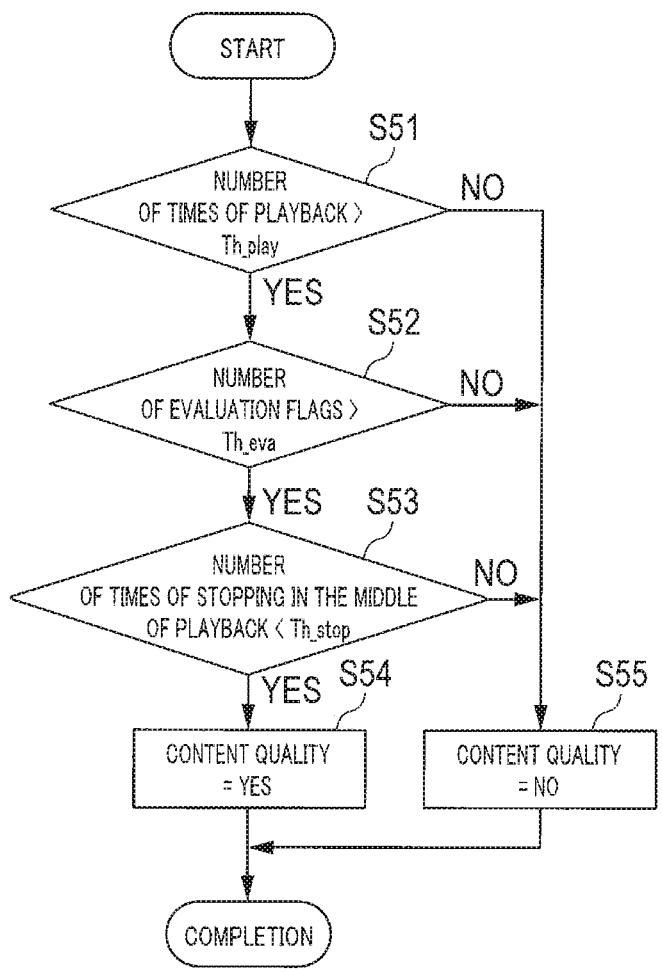
FIG. 11 is a flowchart for describing the details of content quality determination indicated at step S50 of FIG. 10.

FIG. 11 is a flowchart for describing the details of processing of the content quality determination indicated at step S50 in FIG. 10. At step S51, controller 74 of terminal device 7 obtains information on the number of times the content requested by the user has been played in the entire network, and determines whether or not the number of times the content requested by the user has been played in the entire network is greater than predetermined number of times Th_play. For the information on the number of times the content has been played in the entire network, a server which collects such information on the number of times from edge servers may be provided, for example, and terminal device 7 may obtain such information from this server via internet 2. When the number of times the content has been played is greater than predetermined number of times Th_play the processing proceeds to step S52, or, when the number of times the content has been played is equal to or less than predetermined number of times Th_play, the processing proceeds to step S55.

At step S52, controller 74 determines whether or not the number of evaluation flags given by other users to the content requested by the user is greater than predetermined number Th_eva. Note in this case that, the greater number of evaluation flags means higher evaluation to the content. The evaluation flags given to the content by the other users are flags to be given when some other users who viewed the content evaluate the content via internet 2, for example. A server which collects the information on the evaluation flags from edge servers may be provided, for example, and terminal device 7 may obtain such information on the evaluation flags from this server via internet 2. When the number of evaluation flags is greater than predetermined number Th_eva, the processing proceeds to step S53, or, when the number of evaluation flags is equal to or less than predetermined number Th_eva, the processing proceeds to step S55.

At step S53, controller 74 obtains the information on the number of times the playback of the content requested by the user has been stopped in the middle of the playback after the content was played by any of the other users, and determines whether or not said number of times is less than predetermined number of times Th_stop. For the information on the number of times the playback has been stopped in the middle of the playback, a server which collects such information on the number of times from edge servers may be provided, for example, and terminal device 7 may obtain such information on the number of times from this server via internet 2. When the number of times the playback has been stopped in the middle of the playback is less than predetermined number of times Th_stop, the processing proceeds to step S54, or, when the number of times the playback has been stopped in the middle of the playback is equal to or greater than predetermined number of times Th_stop, the processing proceeds to step S55.

When all the determination at steps S51 to S53 indicates YES, controller 74 sets the content-quality-determination result to YES at step S54, and completes the processing. Meanwhile, when any of steps S51 to S53 indicates NO, controller 74 sets the content-quality-determination result to NO at step S55, and completes the processing.

When the result of such content quality determination indicates YES, the processing proceeds to step S25 in FIG. 10. Meanwhile, when the result of the content quality determination indicates NO, the status-quo is maintained after step S50 in FIG. 10 (i.e., terminal device 7 continues to receive the streaming delivery from edge server 4 via low-frequency-band base station 5).

As described above, in Exemplary Operation 4, the content-quality-determination result is set to YES and the subsequent processing (i.e., transmission of the delivery-control-change request) is performed when all of the number of times the content has been played, the number of evaluation flags, and the number of times the playback has been stopped by any of the other users in the middle of the playback satisfy predetermined conditions (i.e., only when the content has a quality equal to or higher than a predetermined level and thus it is considered to be unlikely that the playback of the content is stopped in the middle of the playback while the content is being viewed by a user).

Meanwhile, when the content-quality-determination result indicates NO, terminal device 7 does not transmit the delivery-control-change request. Accordingly, in cases of the content which a user may stop viewing in the middle of the playback of the content, the streaming delivery is continued, so that the situation where an excessive load is caused can be avoided.

Note that, the content-quality-determination result may indicate YES in Exemplary Operation 4 described above when the determination result of any one of the number of times the content has been played, the number of evaluation flags, and the number of times the content is stopped in the middle of the playback by other users indicates YES. Alternatively, the content-quality-determination result may indicate YES when the determination results of multiple kinds of quality indicate YES.

As described above, the present invention is a terminal device configured to receive cache data of content from an edge server via at least one base station, and includes: an edge determining processor configured to determine, when playback of content is requested, whether or not the edge server has the cache data of the content, based on information received from the edge server, the information being information on the cache data which the edge server has; a channel-capacity determining processor configured to determine whether or not the at least one base station is capable of high-speed or high-capacity communication, when the edge server has the cache data of the content; and a delivery-control-change requesting processor configured to transmit, to the edge server, a request to change a delivery control method for the cache data of the content, when the at least one base station is capable of the high-speed or high-capacity communication.

With this configuration, when the edge server has the cache data of the content requested by the user of the terminal device, the terminal device requests the edge server to deliver the cache data of the content. Accordingly, the edge server instead of the original server having the original content data delivers the cache data of the content to the terminal device, so that the load on the wired network (internet and/or the like) between the edge server and the original server does not increase and the traffic in the wired network can be collected to the edge server, and it is also possible to preserve the quality of the content delivered to the terminal device.

Additionally, in the case where the terminal device communicates with the edge server via the low-frequency-band base station during deliver of the cache data of the content, the cache data of the content is obtained using the streaming delivery which does not cause any load on the line. Meanwhile, in the case where the terminal device raises the priority level of the communication with the high-frequency-band base station and can establish the connection with the high-frequency-band base station, the terminal device transmits to the edge server the delivery-control-change request for changing the delivery method from the streaming delivery to the full-download delivery. Thus, it becomes possible to choose a suitable delivery method depending on the current radio-communication environment of the terminal device.

Additionally, only when communicating via the high-frequency-band base station (that is, only when the environment in which high-speed and high-capacity communication is performed is ready), the terminal device requests the full-download delivery which caused a load on the network. It is thus possible to collect, to a high-frequency band, the user traffic in the radio network composed of the terminal device, low-frequency-band base station, and high-frequency-band base station. Thus, it becomes possible to improve the traffic acceptance ratio between the low-frequency-band base station and the high-frequency-hand base station.

The present patent application claims the benefit of priority based on Japanese Patent Application No. 2016-026973 filed on Feb. 16, 2016. The disclosure of the specification, drawings and abstract of the Japanese Patent Application is incorporated in the specification of the present application in its entirety.

INDUSTRIAL APPLICABILITY

The present invention is suitable for a data delivery system configured to deliver content data via a radio network.

REFERENCE SIGNS LIST

100 Data delivery system
1 Original server
2 Internet
3 Gateway
4 Edge server
5 Low-frequency-band base station
6 High-frequency-band base station
7 Terminal device
41 Transmitter
42 Memory
43 Receiver
44 Controller
441 Cache-information generator
442 Delivery-control changing processor
71 Receiver
72 Memory
73 Transmitter
74 Controller
741 Edge determining processor
742 Channel-capacity determining processor
743 RAT-priority-level changing processor (communication-priority-level changing processor)
744 Delivery-control-change requesting processor

The invention claimed is:

1. A terminal device configured to receive cache data of content, the cache data being duplicate data of content data of the content that an edge server previously delivered, the content data being previously delivered from the edge server via at least one base station, the terminal device comprising:
   a receiver configured to receive cache information from the edge server before a delivery request for the content data of the content is received from a user of the terminal device, the cache information including information about an existence of the cache data of the content on the edge server;
   a memory configured to store the cache information; and
   a controller, wherein
   the controller
      determines, when the delivery request for the content data is received from the user, whether or not the edge server has the cache data of the content, based on the cache information stored in the memory,
      determines whether or not the at least one base station is capable of high-speed or high-capacity communication, when the controller determines that the edge server has the cache data of the content, and
      makes a determination of quality of the content, and, in a case where the quality of the content satisfies a predetermined condition, transmits, to the edge server, a request to change a delivery control method for the cache data of the content, when the at least one base station is capable of the high-speed or the high-capacity communication, and the determination of the quality of the content is a determination of a number of times the content has been played, and the predetermined condition is that the number of times the content has been played is greater than a predetermined number of times.

2. The terminal device according to claim 1, wherein the controller makes a determination of a radio communication environment of the terminal device based on policy information set in advance, and, in a case where the radio communication environment of the terminal device is to satisfy the policy information as a result of changing the delivery control method, transmits to the edge server the request to change the delivery control method for the cache data of the content.

3. The terminal device according to claim 2, wherein the policy information relates to a telecommunications charge of the terminal device, and the case where the radio communication environment of the terminal device satisfies the policy information is a case where the telecommunications charge is equal to or less than a predetermined amount of money.

4. The terminal device according to claim 2, wherein the policy information relates to a communication speed of the terminal device, and the case where the radio communication environment of the terminal device satisfies the policy information is a case where the communication speed is greater than a predetermined speed.

5. The terminal device according to claim 1, wherein the controller transmits a request to change the delivery control method for the cache data of the content from streaming delivery to full-download delivery.

6. A data delivery system, comprising:
an edge server,
a base station, and
a terminal device,
the edge server being configured to generate and store cache data of content, the cache data being duplicate data of content data of the content, the content data being previously delivered by another server or the edge server, the edge server being further configured to transmit, to the terminal device and before a delivery request for the content data of the content is received from a user of the terminal device, cache information including information about an existence of the cache data of the content stored in the edge server,
the base station being configured to relay communication between the terminal device and the edge server,
the terminal device being configured to receive the cache information from the edge server before the delivery request for the content data of the content is received from the user of the terminal device, and store the cache information in a memory, the terminal device being further configured to determine, when the delivery request for the content data is received from the user, whether or not the edge server has the cache data of the content, based on the cache information stored in the memory, the terminal device being further configured to determine, when the edge server has the cache data of the content, whether or not the base station is capable of high-speed or high-capacity communication, the terminal device being further configured to make a determination of quality of the content, and, in a case where the quality of the content satisfies a predetermined condition, transmit, to the edge server, a request to change a delivery control method for the cache data of the content, when the base station is capable of the high-speed or the high-capacity communication, wherein the determination of the quality of the content is a determination of a number of times the content has been played, and the predetermined condition is that the number of times the content has been played is greater than a predetermined number of times.

7. A control method for a terminal device, the terminal device being configured to receive cache data of content, the cache data being duplicate data of content data of the content that an edge server previously delivered, the content data being previously delivered from the edge server via at least one base station, the control method comprising:

receiving cache information from the edge server before a delivery request for the content data of the content is received from a user of the terminal device, the cache information including information about an existence of the cache data of the content on the edge server;

storing the cache information in a memory;

determining, when the delivery request for the content data is received from the user, whether or not the edge server has the cache data of the content, based on the cache information stored in the memory;

determining whether or not the at least one base station is capable of high-speed or high- capacity communication, when the determining determines that the edge server has the cache data of the content; and making a determination of quality of the content, and, in a case where the quality of the content satisfies a predetermined condition, transmitting, to the edge server, a request to change a delivery control method for the cache data of the content, when the at least one base station is capable of the high-speed or the high-capacity communication, wherein the determination of the quality of the content is a determination of a number of times the content has been played, and the predetermined condition is that the number of times the content has been played is greater than a predetermined number of times.

8. A terminal device configured to receive cache data of content, the cache data being duplicate data of content data of the content that an edge server previously delivered, the content data being previously delivered from the edge server via at least one base station, the terminal device comprising:

a receiver configured to receive cache information from the edge server before a delivery request for the content data of the content is received from a user of the terminal device, the cache information including information about an existence of the cache data of the content on the edge server;

a memory configured to store the cache information; and a controller, wherein the controller determines, when the delivery request for the content data is received from the user, whether or not the edge server has the cache data of the content, based on the cache information stored in the memory, determines whether or not the at least one base station is capable of high-speed or high-capacity communication, when the controller determines that the edge server has the cache data of the content, and makes a determination of quality of the content, and, in a case where the quality of the content satisfies a predetermined condition, transmits, to the edge server, a request to change a delivery control method for the cache data of the content, when the at least one base station is capable of the high-speed or the high-capacity communication, and the determination of the quality of the content is a determination of a number of times playback of the content has been stopped during the playback, and the predetermined condition is that the number of times the playback of the content has been stopped is smaller than a predetermined number of times.

9. A data delivery system, comprising:

an edge server, a base station, and a terminal device, the edge server being configured to generate and store cache data of content, the cache data being duplicate data of content data of the content, the content data being previously delivered by another server or the edge server, the edge server being further configured to transmit, to the terminal device and before a delivery request for the content data of the content is received from a user of the terminal device, cache information including information about an existence of the cache data of the content stored in the edge server, the base station being configured to relay communication between the terminal device and the edge server, the terminal device being configured to receive the cache information from the edge server before the delivery request for the content data of the content is received from the user of the terminal device, and store the cache information in a memory, the terminal device being further configured to determine, when the delivery request for the content data is received from the user, whether or not the edge server has the cache data of the content, based on the cache information stored in the memory, the terminal device being further configured to determine, when the edge server has the cache data of the content, whether or not the base station is capable of high-speed or high-capacity communication, the terminal device being further configured to make a determination of quality of the content, and, in a case where the quality of the content satisfies a predetermined condition, transmit, to the edge server, a request to change a delivery control method for the cache data of the content, when the base station is capable of the high-speed or the high-capacity communication, wherein the determination of the quality of the content is a determination of a number of times playback of the content has been stopped during the playback, and the predetermined condition is that the number of times the playback of the content has been stopped is smaller than a predetermined number of times.

10. A control method for a terminal device, the terminal device being configured to receive cache data of content, the cache data being duplicate data of content data of the content that an edge server previously delivered, the content data being previously delivered from the edge server via at least one base station, the control method comprising:

receiving cache information from the edge server before a delivery request for the content data of the content is received from a user of the terminal device, the cache information including information about an existence of the cache data of the content on the edge server;

storing the cache information in a memory;

determining, when the delivery request for the content data is received from the user, whether or not the edge server has the cache data of the content, based on the cache information stored in the memory;

determining whether or not the at least one base station is capable of high-speed or high-capacity communication, when the determining determines that the edge server has the cache data of the content; and making a determination of quality of the content, and, in a case where the quality of the content satisfies a predetermined condition, transmitting, to the edge server, a request to change a delivery control method for the cache data of the content, when the at least one base station is capable of the high-speed or the high-capacity communication, wherein the determination of the quality of the content is a determination of a number of times playback of the content has been stopped during the playback, and the predetermined condition is that the number of times the playback of the content has been stopped is smaller than a predetermined number of times.

\* \* \* \* \*